United States Patent [19]

Li et al.

[11] Patent Number: 5,785,868
[45] Date of Patent: Jul. 28, 1998

US005785868A

[54] METHOD FOR SELECTIVE SEPARATION OF PRODUCTS AT HYDROTHERMAL CONDITIONS

[75] Inventors: Lixiong Li; Earnest F. Gloyna, both of Austin, Tex.

[73] Assignee: Board of Regents, Univ. of Texas System, Austin, Tex.

[21] Appl. No.: 526,464

[22] Filed: Sep. 11, 1995

[51] Int. Cl.$^6$ .................... C02F 1/58; C02F 1/72
[52] U.S. Cl. .................. 210/761; 210/762; 423/186; 423/188; 423/189; 423/421; 423/422
[58] Field of Search ................. 210/761, 762, 210/763; 423/184, 186, 188, 189, 421, 422

[56] References Cited

U.S. PATENT DOCUMENTS

| | | | |
|---|---|---|---|
| 2,944,396 | 7/1960 | Barton et al. | 60/39.05 |
| 3,399,035 | 8/1968 | Broich et al. | 23/149 |
| 3,423,471 | 1/1969 | Golden et al. | 260/617 |
| 3,449,247 | 6/1969 | Bauer | 210/63 |
| 3,464,885 | 9/1969 | Land et al. | 162/17 |
| 3,482,936 | 12/1969 | Russell | 23/149 |
| 3,606,999 | 9/1971 | Lawless | 23/1 |
| 3,679,751 | 7/1972 | Golden et al. | 260/586 B |
| 3,716,474 | 2/1973 | Hess et al. | 208/13 |
| 3,839,159 | 10/1974 | Dunnavant et al. | 202/160 |
| 3,853,759 | 12/1974 | Titmas | 210/63 |
| 3,855,392 | 12/1974 | Folkestad et al. | 423/497 |
| 3,895,067 | 7/1975 | Mock et al. | 260/586 AB |
| 3,900,300 | 8/1975 | Lehman | 55/184 |
| 3,912,626 | 10/1975 | Ely et al. | 210/50 |
| 3,917,801 | 11/1975 | Wilson | 423/283 |
| 3,938,972 | 2/1976 | Sugimura | 55/440 |
| 3,948,754 | 4/1976 | McCollum et al. | 208/11 LE |
| 3,984,311 | 10/1976 | Diesen et al. | 210/63 R |
| 4,022,871 | 5/1977 | Demilie | 423/283 |
| 4,058,565 | 11/1977 | Thiel et al. | 260/586 AB |
| 4,058,588 | 11/1977 | Brown et al. | 423/283 |
| 4,141,829 | 2/1979 | Thiel et al. | 210/63 R |

(List continued on next page.)

FOREIGN PATENT DOCUMENTS

| | | |
|---|---|---|
| A-85597/82 | 1/1983 | Australia . |
| 8204075 | 7/1983 | Brazil . |
| 568 882 | 11/1993 | European Pat. Off. . |
| 5391093 | 8/1978 | Japan . |
| 5031000 | 2/1993 | Japan . |
| WO93/22490 | 11/1993 | WIPO . |

OTHER PUBLICATIONS

U.S. application No. 08/340,847, Frisch et al., filed Nov. 1994.

"ECO Waste Technologies and the Huntsman Corporation Host an Introduction to SCWO Technology and a Tour of Their SWCO Facilities," *Separations Update*, p. 3, Center for Energy Studies, University of Texas at Austin, Tischler, C., ed., Summer 1994.

Armellini and Tester, "Salt Separation During Supercritical Water Oxidation of Human Metabolic Waste: Fundamental Studies of Salt Nucleation and Growth, Society of Automotive Engineers (1990), pp. 189–203.

Armellini and Tester, "Solubilities of Sodium Chloride and Sodium Sulfate in Sub–and Supercritical Water Vapor," AIChE National Meeting, Los Angeles, California, Nov. 17–22, 1991, pp. 1–15.

Baillod et al., "Fate of Specific Pollutants During Wet Oxidation and Ozonation," *Environ. Prog.*, 1(3), 217–227, 1982.

Baker et al., "Catalytic Destruction of Hazardous Organics in Aqueous Wastes: Continuous Reactor System Experiments," *Hazardous Waste & Hazardous Materials*, 6(1): 87–94, 1989.

(List continued on next page.)

*Primary Examiner*—Neil McCarthy
*Attorney, Agent, or Firm*—Arnold, White & Durkee

[57] ABSTRACT

Sodium and borate ions are separated in supercritical water by addition of dissolved $CO_2$ to cause precipitation of carbonates and the formation of boric acid. Carbonates and boric acid are then recovered as separate products.

48 Claims, 4 Drawing Sheets

U.S. PATENT DOCUMENTS

| | | | |
|---|---|---|---|
| 4,183,904 | 1/1980 | Meyer | 423/283 |
| 4,212,735 | 7/1980 | Miller | 210/63 R |
| 4,215,094 | 7/1980 | Inao et al. | 423/123 |
| 4,217,218 | 8/1980 | Bauer | 210/63 R |
| 4,221,577 | 9/1980 | Lowrie | 55/392 |
| 4,229,296 | 10/1980 | Wheaton et al. | 210/758 |
| 4,250,331 | 2/1981 | Shimshick | 562/485 |
| 4,251,227 | 2/1981 | Othmer | 48/197 R |
| 4,272,383 | 6/1981 | McGrew | 210/741 |
| 4,289,662 | 9/1981 | Blasius | 252/607 |
| 4,292,953 | 10/1981 | Dickinson | 126/263 |
| 4,294,706 | 10/1981 | Kakihara et al. | 210/762 |
| 4,326,957 | 4/1982 | Rosenberg | 210/436 |
| 4,327,239 | 4/1982 | Dorrance | 585/733 |
| 4,329,154 | 5/1982 | Shono et al. | 23/301 |
| 4,338,199 | 7/1982 | Modell | 210/721 |
| 4,370,223 | 1/1983 | Bose | 208/125 |
| 4,377,066 | 3/1983 | Dickinson | 60/39.05 |
| 4,378,976 | 4/1983 | Rush . | |
| 4,380,960 | 4/1983 | Dickinson | 110/347 |
| 4,384,897 | 5/1983 | Brink | 127/37 |
| 4,435,184 | 3/1984 | Schroeder et al. | 23/300 |
| 4,460,628 | 7/1984 | Wheaton et al. | 427/214 |
| 4,465,888 | 8/1984 | Paspek, Jr. | 585/520 |
| 4,473,459 | 9/1984 | Bose et al. | 208/8 LE |
| 4,483,761 | 11/1984 | Paspek, Jr. | 208/106 |
| 4,543,190 | 9/1985 | Modell | 210/721 |
| 4,559,127 | 12/1985 | Paspek, Jr. | 208/8 LE |
| 4,564,458 | 1/1986 | Burleson | 20/747 |
| 4,593,202 | 6/1986 | Dickinson | 290/54 |
| 4,594,141 | 6/1986 | Paspek, Jr. et al. | 208/390 |
| 4,594,164 | 6/1986 | Titmas | 210/741 |
| 4,654,149 | 3/1987 | Harada et al. | 210/763 |
| 4,668,256 | 5/1987 | Billiet et al. | 55/219 |
| 4,698,157 | 10/1987 | Gillot | 210/496 |
| 4,699,720 | 10/1987 | Harada et al. | 210/762 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,767,543 | 8/1988 | Chornet et al. | 210/759 |
| 4,792,408 | 12/1988 | Titmas | 210/747 |
| 4,793,153 | 12/1988 | Hembree et al. | 62/476 |
| 4,818,370 | 4/1989 | Gregoli et al. | 208/106 |
| 4,822,394 | 4/1989 | Zeigler et al. | 62/17 |
| 4,822,497 | 4/1989 | Hong et al. | 210/721 |
| 4,840,725 | 6/1989 | Paspek | 208/130 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,880,440 | 11/1989 | Perrin | 55/16 |
| 4,891,139 | 1/1990 | Zeigler et al. | 210/747 |
| 4,898,107 | 2/1990 | Dickinson | 110/346 |
| 4,936,990 | 6/1990 | Brunsell et al. | 210/331 |
| 4,968,328 | 11/1990 | Duke | 55/1 |
| 4,983,296 | 1/1991 | McMahon et al. | 210/603 |
| 5,009,857 | 4/1991 | Haerle | 422/180 |
| 5,011,614 | 4/1991 | Gresser et al. | 210/761 |
| 5,053,142 | 10/1991 | Sorenen et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. . | |
| 5,100,560 | 3/1992 | Huang | 210/721 |
| 5,106,513 | 4/1992 | Hong | 210/759 |
| 5,133,877 | 7/1992 | Rofer et al. | 210/761 |
| 5,183,577 | 2/1993 | Lehmann | 210/761 |
| 5,192,453 | 3/1993 | Keckler et al. | 210/761 |
| 5,200,093 | 4/1993 | Barner et al. | 210/761 |
| 5,221,486 | 6/1993 | Fassbender | 210/757 |
| 5,221,773 | 6/1993 | Nakamura et al. | 568/887 |
| 5,232,604 | 8/1993 | Swallow et al. | 210/759 |
| 5,232,605 | 8/1993 | Baur et al. | 210/761 |
| 5,234,584 | 8/1993 | Birbara et al. | 210/181 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |
| 5,358,646 | 10/1994 | Gloyna et al. . | |
| 5,421,998 | 6/1995 | Li et al. . | |
| 5,454,950 | 10/1995 | Li et al. . | |
| 5,527,466 | 6/1996 | Li et al. . | |
| 5,565,616 | 10/1996 | Li et al. . | |
| 5,578,647 | 11/1996 | Li et al. . | |

OTHER PUBLICATIONS

Baker et al., "Membrane Separation Systems—A Research & Development Needs Assessment," Department of Energy Membrane Separation Systems *Research Needs Assessment Group, Final Report*, II, Mar., 1990.

Chowdhury et al., "Catalytic Wet Oxidation of Strong Waste Waters", AIChE Symp. 151:71 (1975), pp. 46–58.

Conditt and Sievers, "Microanalysis of Reaction Products in Sealed Tube Wet Air Oxidations by Capillary Gas Chromatography," *Anal. Chem.*, 56:2620–2622, 1984.

Corcoran, "Pyrolysis of n–Butane," *Pyrolysis: Theory and Industrial Practice*, 47–69, 1983.

Crain et al., "Kinetics and Reaction Pathways of Pyridine Oxidation in Supercritical Water," *Ind. Eng. Chem. Res.*, 32(10):2259–2268, 1993.

Day et al., "Oxidation of Propionic Acid Solutions," *Can. J. Chem. Eng. 51*, 733–740, 1973.

Dell'Orco and Gloyna, "The Separation of Solids from Supercritical Water Oxidation Processes", presented at AICHE Annual Meeting, Nov. 18–23, 1991.

Dell'Orco, et al., "The Solubility of 1:1 Nitrate Electrolytes in Supercritical Water," *Los Alamos National Lab Report*, LA–UR–92–3359, pp. 1–17, 1992.

Fisher, "Oxidation of Sewage With Air at Elevated Temperatures," *Water Research*, 5:187–201, 1971.

Freeman, "4. Wet Oxidation," *Innovative Thermal Hazardous Organic Waster Treatment Processes*, Noyes Publications: Park Ridge, New Jersey (1985), pp. 12–33.

Gloyna, "Supercritical Water Oxidation—Deep Wall Technology for Toxic Wastewaters and Sludges", Technical Report, The University of Texas at Austin, 1989.

Gloyna et al., "Testing Support of Supercritical Fluid Processing For the Destruction of Toxic Chemicals," *Interm Report*, Center for Energy Studies, Balcones Research Center, The University of Texas at Austin, Austin, TX, Nov. 30, 1993.

Gustafson and Zoeller, "Other Synthesis Gas–Based Acetic Acid Processes," *Acetic Acid and its Derivatives*, pp. 53–60, Agreda et al., eds., Marcel Dekker, Inc., New York, 1993.

Herman, R.G., ed., *Catalytic Conversation of Synthesis Gas and Alcohols to Chemicals*, pp. 37–283, Plenum Press, New York, 1984.

Holgate et al., "Carbon Monoxide Oxidation in Supercritical Water: The Effects of Heat Transfer and the Water–Gas Shift Reaction on Observed Kinetics," *Energy & Fuels*, 6:586–597, 1992.

Hudson and Keay, "The Hydrolysis of Phosphonate Esters," *Journal of the Chemical Society*, 2463–2469, 1956.

Huppert et al., "Hydrolysis in Supercritical Water: Identification and Implications of a Polar Transition State," *Ind. Eng. Chem. Res.*, 28:161–165, 1989.

Hurwitz et al., "Wet Air Oxidation of Sewage Sludge," *Water & Sewage Works*, 112(8):298–305, 1965.

Imamura, et al., "Wet Oxidation of Acetic Acid Catalyzed by Co-Bi Complex Oxides", *Ind. Eng. Chem. Prod. Res. Dev.*, 21 (4), pp. 570–575 (1982).

Irick, "Manufacture via Hydrocarbon Oxidation," In Acetic Acid and its Derivatives, Ed. by Agreda and Zoeller, Marcel Dekker, Inc., New York, 1993.

Jacobs et al., "Phase Segregation", *Handbook of Separation Process Technology*, published by John Wiley & Sons (1987).

Keen and Baillod, "Toxicity to the *Daphnia* of the End Products of Wet Oxidation of Phenol and Substituted Phenols," *Water Res.*, 19(6):767–772, 1985.

Klein et al., "Hydrolysis in Supercritical Water: Solvent Effects as a Probe of the Reaction Mechanism," *J Supercritical Fluids*, 3(4):222–227, 1990.

Kracek et al., The System, Water—Born Oxide pp. 143–171.

Ladendorf, K., "Company hopes treatment cuts waste," *Austin American–Statesman*, pp. D1–D3, Aug. 25, 1994.

LeBlanc et al., "Production of Methanol," *Methanol Production and Use*, pp. 73–113, Ch. 3.3, Chen et al., eds., Marcel Dekker, Inc., New York, 1994.

Lee et al., "Efficiency of Hydrogen Peroxide and Oxygen in Supercritical Water Oxidation of 2,4–Dichlorophenol and Acetic Acid", *The Journal of Supercritical Fluids*, 3 pp. 249–255 (1990).

Lei Jin et al., "The Effect of Supercritical Water on the Catalytic Oxidation of 1–4–Dichlorobenzene", presented a AIChE Spring Meeting, Orlando, FL, Mar. 19–23 (1990), Abstract.

Lu et al., "Selective Particle Deposition in Crossflow Filtration", *Sep. Sci. and Technol.*, 24(7&8):517–540 (1989).

Mahlman et al., "Cross–Flow Filtration in Physical–Chemical Treatment of Minicipal Sewage Effluents", Oak Ridge Natl. Lab. Technical Report, EPA/600/2–76/025, Feb. 1976.

Matson and Smith, "Supercritical Fluid Technologies for Ceramic–Processing Applications," *J. Am. Ceram. Soc.*, 72(6):871–881, 1989.

McBrayer et al., "Research and Development of a Commercial Supercritical Water Oxidation Process," *Proceedings of the Eleventh Annual Environmental Management and Technology Conference/International*, Atlantic City, NJ, 90–111, Jun. 9–11, 1993.

McConnell and Head, "Pyrolysis of Ethane and Propane," *Pyrolysis: Theory and Industrial Practice*, Ch. 2, 25–47, 1983.

McGinnis et al., "Conversion of Biomass into Chemicals with High–Temperature Wet Oxidation," *Ind. Eng. Chem. Prod. Res.*, 22(4):633–636.

McKendry et al., "The Effect of Additives on the Oxidation of Dimethyl Methylphosphonate in Supercritical Water," Abstract, Industrial Waste Conference, Purdue University, West Lafayette, Indiana, May 9–11, 1994.

Modell et al., "Supercritical Water—Testing Reveals New Process Holds Promise", *Solid Wastes Management*, Aug. 1982.

Murkes, "Low–shear and High–shear Cross–flow Filtration", *Filtration and Separation*, 23(6), 364–365 (1986).

Murkes et al., *Crossflow Filtration: General Background*, John Wiley & Sons: New York, 1988.

O. I. Martynova, Solubility of Inorganic Compounds in Subcritical and Supercritical Water, *High Temperature High Pressure Eelctrochemistry in Aqueous Solutions*. National Association of Corrosion Engineers, 4:131–138, 1976.

Opatken, "Aqueous–Phase Oxidation of Sludge Using the Vertical Reaction Vessel System", EPA/600/2–87/022, Mar. 1987.

Partin and Heise, "Bioderived Acetic Acid," Ch. 1, 3–15, 1993.

Perona et al., "A Pilot Plant for Sewage Treatment by Cross–Flow Filtration", Oak Ridge Natl. Lab. Technical Report ORNL–TM–4659, Oct. 1974.

Sharpira et al., "Removal of Heavy Metals and Suspended Solids from Battery Wastewaters: Application of Hydroperm Cross–flow Microfiltration", Gen. Battery Corp. Report EPA/600/2–81/147, Aug. 1981.

Stone & Webster Engineering Corp., "Assessment and Development of an Industrial Wet Oxidation System for Burning Waste and Low Grade Fuels", Fianal Report, Work Performed Under Contract DE–FC07 881D12711, Prepared for U.S. Department of Energy, Sep., 1989.

Taylor and Weygandt, "A Kinetic Study of High Pressure Aqueous Oxidations of Organic Compounds Using Elemental Oxygen," *Can. J. Chem.*, 52:1925–1933, 1974.

Teletzke, "Wet Air Oxidation", *Chem. Eng. Prog.*, 60(1):33–38, Jan. 1964.

Teletzke et al., "Components of Sludge and Its Wet Air Oxidation Products," *Journal WPCF*, 39(6):994–1005, 1967.

Tester et al., "Supercritical Water Oxidation Technology: A Review of Process Development and Fundamental Research," *ACS Symposium Series Paper*, Oct. 1–3, Atlanta, Georgia, 1993.

Thomason et al., "Supercritical Water Destruction of Aqueous Wastes", *Hazardous Waste*, 1(4), 453–467 (1984).

Tödheide et al., "Das Zweiphasengebiet und die kritische Kurve im System Kohlendioxid—Wasser bis zu Drucken von 3500 bar," *Zeitschrift für Physikalischo Chemie Neue Folge*, Bd. 37:387–401 (1963).

Townsend et al., "Solvent Effects during Reactions in Supercritical Water", *Ind. Eng. Chem. Res.*, 27:143–149, 1988.

Turner, "Supercritical Water Oxidation of Dimethyl Methylphosphonate and Thiodiglycol," Ph.D. Dissertation, Civil Engineering Department, The University of Texas at Austin, Austin, Texas, 1994.

United States Environmental Protection Agency, "Gas–Phase Chemical Reduction," *Demonstration Bulletin*, EPA/540/MR–93/522, 1993.

Urusova, "Phase Equilibria in the Sodium Hydroxide–Water and Sodium Chloride–Water Systems at 350–550°,"*Russian Journal of Inorganic Chemistry*, 19(3):450–454, 1974.

Valyashko, "PhaseEquilibria in Water–Salt Systems: Some Problems of Solubility at Elevated Temperature and Pressure," *High Temperature High Pressure Electrochemistry in Aqueous Solutions*. National Association of Corrosion Engineers, 4:153–157, 1976.

Webley et al., "Oxidation Kinetics of Ammonia and Ammonia–Methanol Mixtures in Supercrital Water in the Temperature Range 530–700 C at 246 bar," *Ind. Eng. Chem. Res.*, 30:1745–1754, 1991.

Yang et al., "Homogeneous Catalysis in the Oxidation of p–Chlorophenol in Supercritical Water", *Ind. Eng. Chem. Res.*, 27(1), pp. 2009–2014 (1988).

Yoshiaki Harada, "Wet Catalytic Oxidation Process for Wastewater Treatment", *Abstract* (1991).

Zimmermann, "New Waste Disposal Process", *Chem. Eng.*, pp. 117–120, Aug. 1958.

Zimmermann et al., "The Zimmermann Process and Its Applications in the Pulp and Paper Industry", TAPPI, 43(8):710–715 (1960).

Zoeller, J.R., "Manufacature vai Methanol Carbonylation," *Acetic Acid and its Derivatives*, pp. 35–51, Agreda et al., eds., Marcel Dekker, Inc., New York, 1993.

METHOD FOR SELECTIVE SEPARATION OF PRODUCTS AT HYDROTHERMAL CONDITIONS

BACKGROUND OF THE INVENTION

This invention concerns the separation of borate from sodium ion in aqueous composition under supercritical water conditions in the presence of dissolved carbon dioxide, either generated from in situ organic carbon conversion or introduced by direct injection, followed by precipitation of sodium carbonate and recovery of a boric acid solution.

The unique characteristics of the SCWO process are the basis of this waste treatment and by-product recovery concept. In addition to well-documented high organic conversion efficiencies, low solubilities of inorganic salts and metal hydroxides in supercritical water and other favorable properties of water offer new separation possibilities.

Certain manufacturing processes, such as nylon monomer production processes, produce borate as a waste by-product. For environmental and/or economic reasons, it is desirable to separate the borate from the aqueous waste stream, and to recycle it in the form of boric acid or meta-boric acid for re-use in the manufacturing processes. In some processes, the aqueous waste may contain variable amounts of sodium ion, as well as suspended or dissolved organic compounds. A method would be desirable for removing all of these compounds from the waste stream in an environmentally acceptable form.

The oxidation of suspended or dissolved hydrocarbons with molecular oxygen in the presence of a boron compound, followed by recovery of boric acid, was described by Thiel et al. (U.S. Pat. No. 4,058,565). However, Thiel et al. did not disclose the separation of aqueous sodium ion from borate, nor did they disclose the use of supercritical water conditions for separation purposes. Brown et al. (U.S. Pat. No. 4,058,588) described a process for recovering boric acid from a sodium borate-mineral acid mixture, using solvent extraction procedures. Brown et al. did not disclose the use of supercritical water conditions, nor did they utilize sodium carbonate precipitation for the separation step of the procedure.

Armellini and Tester (Armellini and Tester, "Salt Separation During Supercritical Water Oxidation of Human Metabolic Waste: Fundamental Studies of Salt Nucleation and Growth," SAE Technical Paper Series No. 901313, 20th Inter. Conf. on Environ. Systems, Williamsburg, Va., Jul. 9–12 (1990)) proposed the separation of solid salts produced in the process of oxidizing organic material in supercritical aqueous ionic solutions. This process was designed to separate salts in general from the aqueous medium, and not to separate one ionic species from another. They also did not disclose a carbonate precipitate.

SUMMARY OF THE INVENTION

This invention provides a solution to one or more of the problems described below.

In one broad respect, this invention is a process useful for separating metal ions from an anionic counterions in an aqueous composition containing the metal ions and anionic counterions, comprising:

contacting the aqueous composition with a second anionic counterion under supercritical water conditions such that the metal ions and the second anionic counterion form a precipitate, wherein the metal ions are more soluble in supercritical water with the first anionic counterions than with the second anionic counterions; and separating the precipitate from the first anionic counterions.

This invention, in another broad respect is a process useful for the separation of alkali metal from borate in an alkali metal borate aqueous composition, comprising: contacting the aqueous composition with carbon dioxide under supercritical water conditions such that alkali metal carbonate precipitates and boric acid forms; and separating the boric acid from the alkali metal carbonate precipitate.

This invention, in another broad respect is a process useful for separating alkali metal ions and borate ions from an aqueous composition containing alkali metal ions, borate and organic material, comprising: contacting the aqueous composition with oxygen under supercritical water conditions to oxidize organic material to form carbon dioxide such that the carbon dioxide and alkali metal form an alkali metal carbonate precipitate and such that boric acid forms; and separating the boric acid from the alkali metal carbonate precipitate.

In another broad respect, this invention is a process useful for separating alkali metal ions from organic materials, comprising the steps of: contacting an aqueous composition containing alkali metal carboxylate with carbon dioxide under supercritical water conditions such that alkali metal carbonate precipitates and such that carboxylic acid forms; and separating the carboxylic acid from the alkali metal carbonate precipitate.

Advantageously, this invention provides a process for the simultaneous destruction of organic waste and separation of alkali metal ions from borate ions that may be present in industrial waste streams. Thus, the present invention provides a process wherein alkali metal ions are precipitated as alkali metal carbonate, which is insoluble in supercritical water, typically the solubility is less than a few mg solute/kg solution. Furthermore, the borate ions present in the aqueous composition from an industrial waste stream are often present as a reaction product from boric acid. Boric acid is commonly used in certain manufacturing processes. Since the borate may be conveniently converted to boric acid using the process of this invention, the boric acid generated from the practice of this invention may be recycled for further use in the manufacturing process. In addition, the present invention can be practiced in a variety of embodiments to separate organic acids from alkali salts thereof by addition of carbon dioxide, either by direct introduction of carbon dioxide or by partial oxidation of the organic acid precursors. Still further, the present invention can be practiced such that combinations of carbon dioxide addition, oxidation of organic materials by adding oxygen during the contacting step, and so forth can be employed to isolate alkali metal ions from the aqueous composition.

As used herein, "SCW" means supercritical water and "SCWO" means supercritical water oxidation. The aqueous composition used in the practice of this invention may be a solution of water soluble substances or a solids-containing slurry.

DETAILED DESCRIPTION OF THE INVENTION

The present process is operated under supercritical water conditions. Supercritical water exists at a temperature of at least 374° C. and a pressure of at least 221 bar (3205 psia). Supercritical water behaves like a dense gas, with properties of a nonpolar solvent, dissolving most organic substances in all proportions as well as most gases in all proportions. It should be appreciated that supercritical water has properties different from a gas (steam) and different from a liquid. Consequently, the behavior of substances, including salts, may also be different in supercritical water. For instance, oxygen is infinitely soluble in supercritical water whereas the solubility of oxygen in liquid water is below the level required, for instance, for efficient oxidation of organic materials, in the absence of agitation which avoids excessive mass transfer resistance between gas and liquid or solid phases.

Beyond the supercritical point of water, salts become increasingly insoluble while organics and oxygen become completely miscible. These properties can be utilized for selective salts separation and efficient organic conversion. In addition, water is an excellent medium for effective heat transfer or direct utilization as steam.

The metal ions which can be separated during the practice of this invention include any metal ions which form insoluble salts with anions present under supercritical water conditions. For example, metal ions which can be precipitated with halide, phosphate, sulfate, nitrate and carbonate, particularly carbonate, are suitable. Metal ions which are preferably separated in the practice of this invention are the alkali metal ions, particularly sodium ion.

Preferably, this invention is operated at a temperature greater than about 400° C. Preferably, this invention is operated at a temperature less than about 550° C. Preferably, this invention is operated at a pressure of from about 241 bar (3500 psia) to about 345 bar (5000 psia).

In the practice of this invention, $CO_2$ may be added to bring about precipitation of metal ions under SCW conditions. To introduce the $CO_2$ into the process, the $CO_2$ can be added directly, can be produced in situ by oxidation of organic compounds present in the aqueous composition, directly or combination thereof. When $CO_2$ is generated in situ, oxygen is used to oxidize organic materials and this process may be referred to as supercritical water oxidation. It may be appreciated that the amount of $CO_2$ and/or oxygen present can be varied to bring about the desired amounts of metal ion removal and/or organic compound destruction by oxidation.

In this process, $CO_2$ or other anionic species such as halide, nitrate, phosphate and sulfate combines with metal ion and water to form a salt and the acid form of the original counter ion of the metal ion originally present. A representative equation illustrating this process is as follows:

$$2Na_3BO_3 + 3H_2O + 3CO_2 \xrightarrow{SCW} 3Na_2CO_3 \downarrow + 2H_3BO_3$$

When carbon dioxide reacts with the alkali metal ion in the equation above, a bicarbonate salt may also form. As used herein, "carbonates" refers to carbonate or bicarbonate.

As stated above, this invention can also be practiced via SCWO to produce $CO_2$ in situ. In this regard, the oxygen at least partially destroys organic materials present to form $CO_2$. $CO_2$ and $H_2O$ forms carbonates, with the carbonates then forming a precipitate with alkali metal ion. A representative equation illustrating this scheme is as follows:

In this equation R is an alkyl radical (where carbon content affects the content of $CO_2$ formed).

Combinations of the above schemes are also contemplated such as illustrated in the following nonstoichiometric representative equation:

$$Na_3BO_3 + 2RCH_2CO_2Na \xrightarrow{SCW}$$

$$\downarrow$$

$$H_3BO_3 + Na_2CO_3 \downarrow + CO_2 + 2RCO_2H$$

The oxygen employed in this invention can be pure oxygen or in a mixture of gases such as air. The amount of oxygen employed is an amount sufficient to bring about the desired amount of oxidation of the organic materials. If total oxidation is desired, at least a stoichiometric amount of oxygen is used. Excess oxygen can be employed. Oxygen can be added to the reactor continuously, intermittently, at a single inlet point, at multiple inlet points or combinations thereof. For example, if the process is conducted in steps such that oxygen is initially present in an amount to only partially oxidize the organic materials, one or more steps may follow wherein more oxygen is added.

It is contemplated that when $CO_2$ is generated in situ by supercritical water oxidation, the SCWO of organic substances can be conducted in the presence of catalysts such as solid catalysts. When a solid catalyst is employed, it may be desirable to conduct the oxidation prior to contacting the oxidation products with metal ions so that precipitation does not occur in the catalyst zone. For example, U.S. Pat. Nos. 4,338,199 and 4,543,190, incorporated herein by reference, describe SCWO processes employing common metal oxide or supported metal catalysts which provide sufficient activity for oxidation such as $Fe_3O_4$, $MnO_2$ and CuO, NiO, $Al_2O_3$, $Cu_3O_4$, AgO, Pt or Pd. Other catalysts include nickel supported on calcium aluminate, $SiO_2/Al_2O_3$, kieselguhr, $MgAl_2O_4$, $MgO/Al_2O_3$ or aluminas. It is also contemplated that certain solid supports may serve as catalysis per se, such as titanium oxide and zinc oxide.

When a catalyst is employed, the amount is any amount effective to catalyze oxidation of organic materials during operation of the process. In either a batch reactor, or a continuous process where a fixed bed reactor, for instance, is used, the amount will vary depending on reactor size, temperature, and residence time.

The organic materials used in the practice of this invention are essentially any organic materials that can produce sufficient amounts of $CO_2$ for the formation of carbonate salts. Such organic materials may include biomass and wastes. Organic materials may be aliphatic and aromatic hydrocarbons and derivatives thereof containing heteroatoms, such as halogens, sulfur, phosphorous and nitrogen. Under SCWO conditions, these heteroatoms may form $X^-$, $SO_4^{2-}$, $PO_4^{3-}$, $NO_3^-$. Metal ions can be precipitated by these anion species in a fashion similar to that of $CO_3^{2-}$.

Preferred organic materials include carboxylic acids and alkali metal carboxylates having from about 6 to 16 carbon atoms and containing one or two acid groups. Representative examples of such carboxylic acids and carboxylates include dodecanedioic acid, undecanedioic acid, undecanoic acid, dodecanoic acid and alkali metal salts thereof.

The metal precipitate which precipitates during the practice of the invention may be readily separated or removed from the resulting aqueous composition. For instance, in a continuous flow apparatus, the alkali metal carbonate may be in situ separated and collected in one effluent stream and the remaining acid solution in another effluent stream. Similarly, in a batch reaction, as in an autoclave reactor, the system can be cooled with the resulting aqueous solution decanted and filtered and the alkali metal carbonate collected. By "resulting aqueous composition" it is meant the aqueous composition resulting after at least a portion of the metal ions have precipitated as alkali metal carbonate. Depending on the substances initially present in the aqueous solution, the resulting aqueous solution may contain boric acid, carboxylic acid, or mixtures thereof, or mineral acids containing halogen, nitrogen, sulfur, or phosphorous.

DETAILED DESCRIPTION OF THE DRAWINGS

Figure 1:
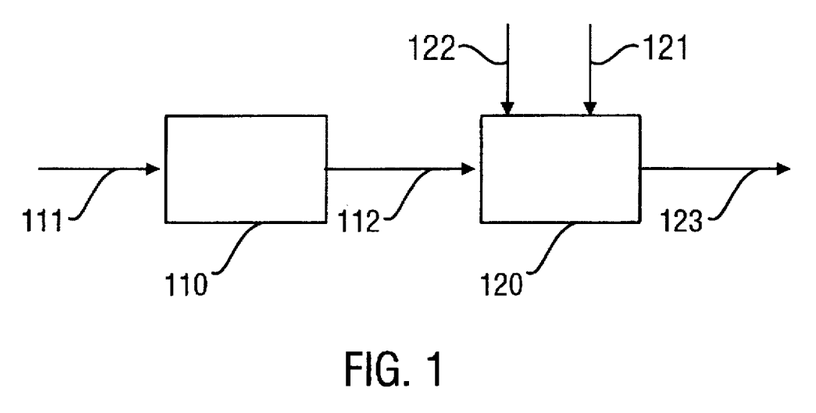
FIG. 1 illustrates a block flow diagram of one embodiment of the invention.

A simple block diagram of the process of this invention is illustrated in FIG. 1. In FIG. 1, aqueous feed containing sodium ions and borate enters preheater 110 via line 111. After being preheated in preheater 110, the pre-heated effluent enters supercritical water reactor 120 via line 112. In reactor 120, supercritical water conditions are maintained. To effect precipitation of the sodium, $CO_2$ can be injected into reactor 120 via line 121. Alternatively, if organic material is present in the feed, oxygen can be introduced into reactor 120 via line 122 to generate $CO_2$ in situ by oxidation of the organic material. By varying the amount of oxygen introduced, the extent of oxidation of the organic material can be controlled, thereby controlling the amount of $CO_2$ in reactor 120. It is contemplated that both $CO_2$ and oxygen can be introduced into reactor 120 together or sequentially. Furthermore, a solution or mixture of $CO_2$ and $H_2O$ may be injected into the reactor 120 via line 121 in some applications. The reactor 120 can be a batch reactor such as autoclave bomb, or can be a tubular vessel designed for continuous or intermittent operation and capable of withstanding the temperatures and pressures. In FIG. 1 the sodium carbonates may precipitate in which case the sodium carbonates may need to be removed periodically, as needed. The boric acid, which has a relatively high solubility in SCW, is recovered via line 123.

Figure 2:
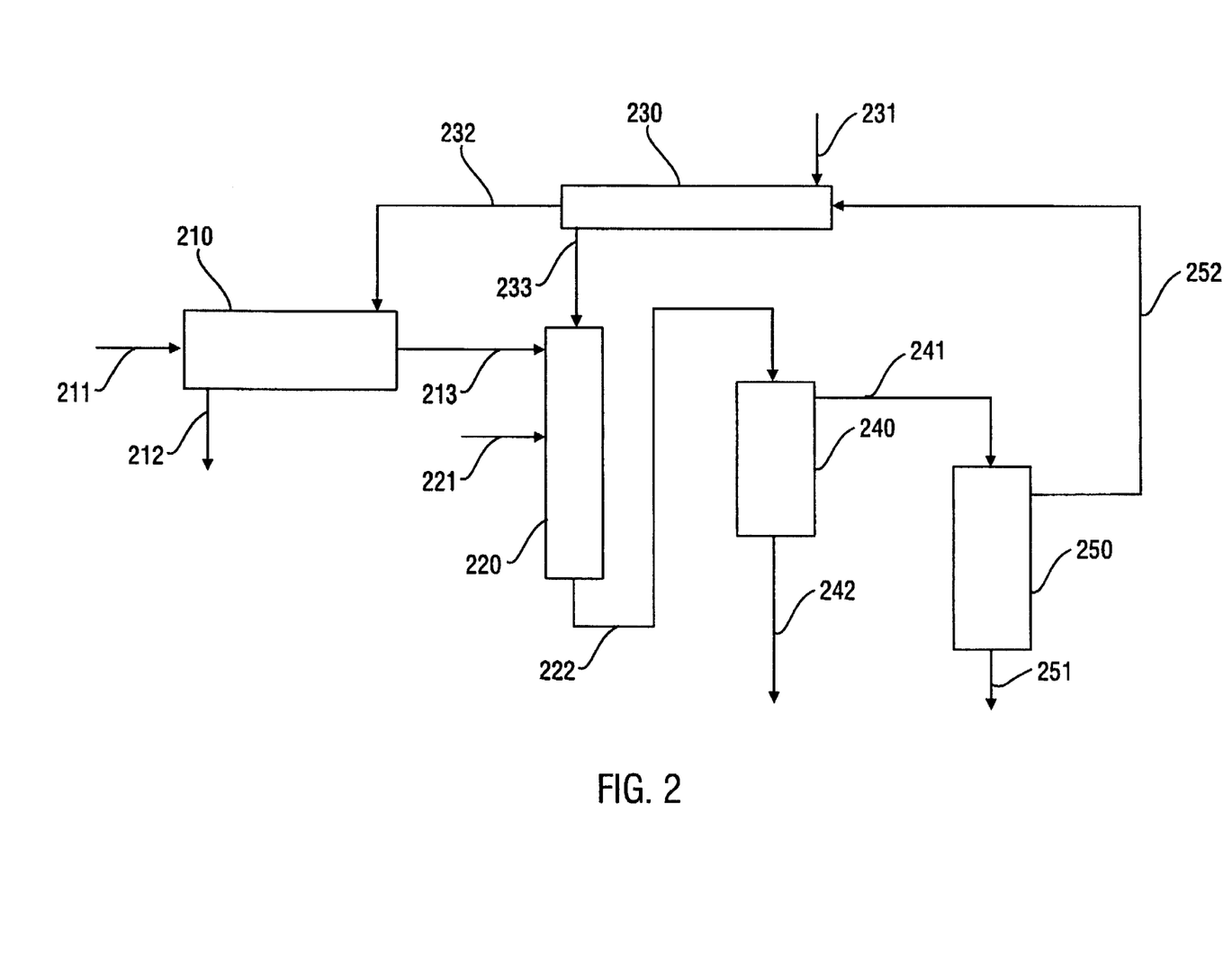
FIG. 2 illustrates a flow diagram of another embodiment of the invention.

Another process flow diagram is shown in FIG. 2. A suitable operating pressure, typically ranging from 3500 psi to 4000 psi, will depend on salt solubilities and practical issues regarding capital and operating costs. The pressurized wastewater feed stream enters feed heat exchanger 210 via line 211. The pressurized and heated stream enters reactor 220 via line 213. Pressurized oxygen entering the process via line 231 may be pre-heated by a heat exchanger 230. The heated and pressurized oxygen is then introduced into the reactor 220 via line 233. Additional $O_2$, $CO_2$, or other additives may be directly injected into the reactor 220 via line 221. The reactor effluent containing the precipitated sodium carbonates exits via line 222 and is directed to a salt separator 240. The reactor 220 and separator 240 can be designed as a single unit, where precipitated salts can be in situ separated. Brine (sodium carbonates) exits salt separator 240 via line 242. The light fraction from the salt separator will be sent out to an acid concentrator 250 via line 241 to produce a concentrated boric and carbonic acid stream that exits concentrator via line 251. Carbonic acid may be removed by flashing off carbon dioxide from this acid mixture because of anticipated low pH of this mixture, or if necessary pH may be adjusted (such as, addition of boric acid) to produce the final aqueous stream containing boric acid. The remaining water stream from the acid concentrator 250 may be returned to the shell side of the oxygen heat exchanger 230 via line 252, and then returned to the feed heat exchanger 210 via line 232. The high-pressure steam exiting from the heat exchanger 210 via line 212 may have further utility value.

Figure 3:
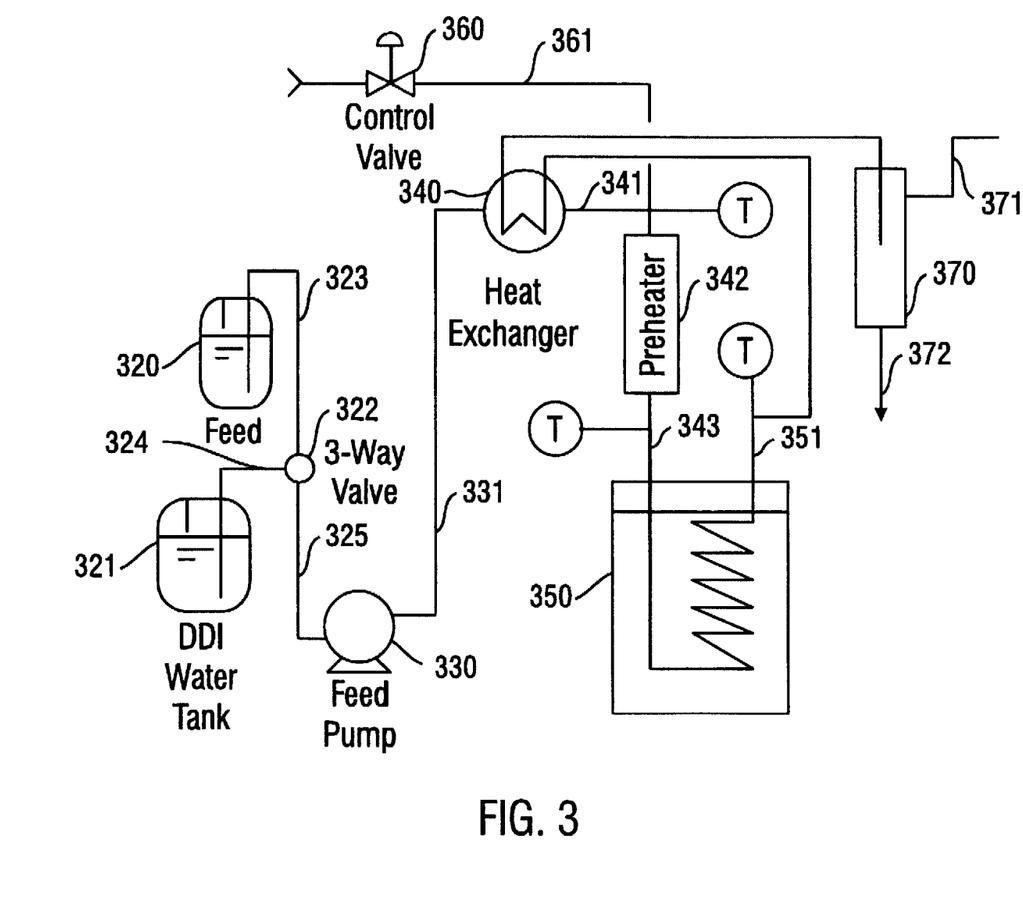
FIG. 3 illustrates a continuous flow process of this invention.

A process flow diagram of a continuous-flow SCWO system is shown in FIG. 3. In FIG. 3, an aqueous composition containing alkali metal ions and borate anions from feed tank 320 enters valve 322 via line 323 and water from water tank 321 enters valve 322 via line 324. The aqueous composition enters pump 330 via line 325 and exits pump 330 via line 331. Line 331 leads to heat exchanger 340 where initial preheating occurs. Aqueous composition exits preheater 340 via line 341 and enters into preheater 342 where further preheating occurs. Preheated aqueous composition exits preheater 342 via line 343 and then enters into heating region 350 where the aqueous composition in line 343 is heated such that supercritical water conditions are created within line 343 in the heating region 350. In heating region 350, a fluidized sand bath is employed. Oxygen is introduced upon opening of control valve 360 such that oxygen flows through line 361 to tie into line 341 prior to the aqueous composition entering preheater 342. In reactor 349, oxidation of organic material present in the aqueous composition is effected such that carbon dioxide is produced whereby sodium carbonate precipitates in line 343 in reactor 349. Effluent from reactor 349 exits via line 351 to heat exchanger 340 and then to acid condenser 370. In acid condenser 370, the light fraction consisting of boric acid and excess $CO_2$ is recovered via line 371 and the salt concentrate is obtained via line 372. It should be noted oxygen may be supplied to control valve 360 from a high pressure oxygen supply not shown.

Figure 4:
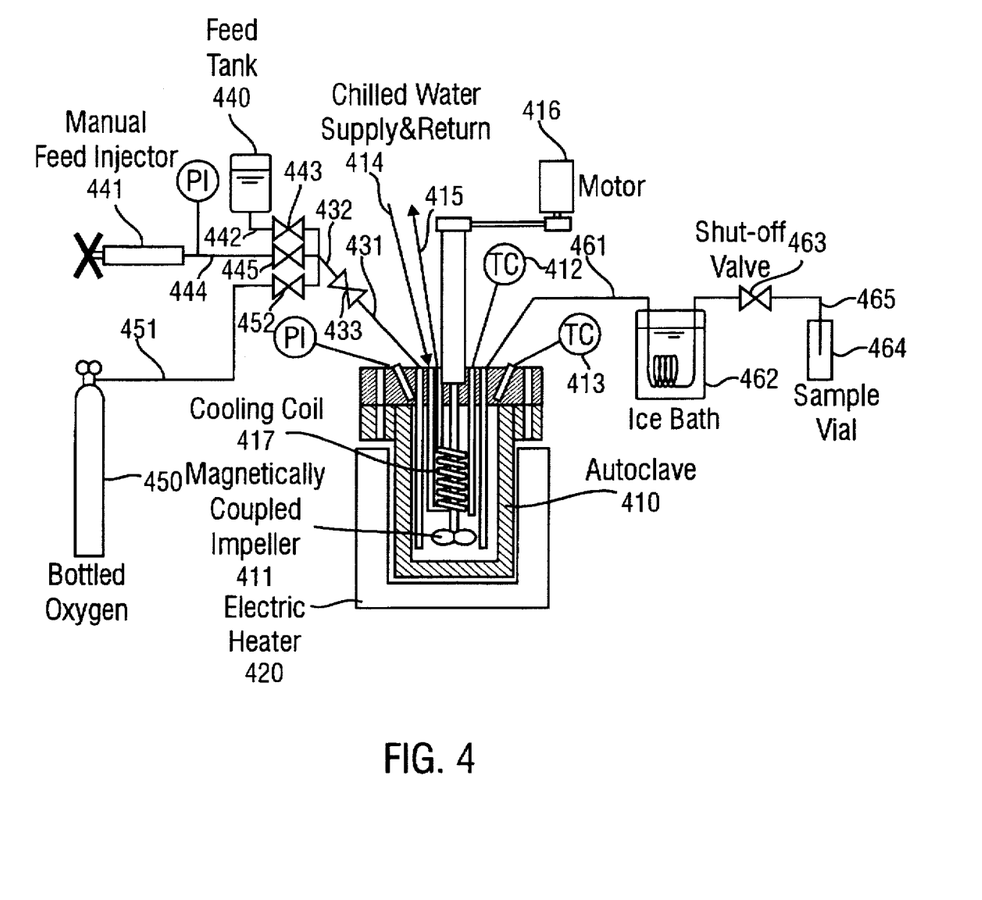
FIG. 4 illustrates an autoclave based system useful in the practice of this invention.

In FIG. 4 there is shown a schematic of a magnetically stirred autoclave used in Example 1. The autoclave 410 functions as the reactor where supercritical water conditions are maintained. Autoclave 410 is heated via electric heater 420. The autoclave 410 is initially loaded with sufficient solids. The autoclave 410 employs a magnetically coupled impeller 411 to effect stirring in the autoclave. Thermalcouples 412 and 413 monitor the reactor conditions. Cold water inlet and exit 414 and 415 are used to cool the internal contents of the autoclave 410 as appropriate. A motor 416 is configured to control the speed of the magnetically coupled impeller 411. Feed is injected from manual feed injector 441 into the autoclave via lines 431 and 432, and through valve 433. Water from tank 440 is drawn into manual feed injector 441 through lines 442 and 444. If the feed is introduced via manual feed injector 441, the aqueous feed enters line 431 via line 444 after passing through valve 445. Oxygen is supplied via tank 450 from line 451. The feed, which may contain alkali metal ions and borate anions and, optionally, organic material exits feed tank 440 via line 442 and through valve 443 to line 431. The oxygen enters line 431 after passing through valve 452. In Example 1, valve 452 is closed such that no oxygen enters autoclave 410. The cold water input and output lines 414 and 415 form cooling coil 417. Reactor effluent exits via line 461 and thereafter passes through ice bath 462 with the cooled effluent then passing through valve 463 with the contents being collected in sample vial 464 via line 465. In FIG. 4, the letters "PI" denote a pressure indicator and "TC" denotes a thermalcouple.

The following examples are provided as illustrative of the present invention and are not to be construed as limiting the scope of the invention and claims thereof. All percentages are by weight unless denoted otherwise. The first example was intended to establish thermodynamic (solubility) limits for this salt formation and separation process. The second example illustrates results from several continuous-flow experiments which demonstrate the present invention using an aqueous waste sample from a manufacturing process used to make cyclodecanol and cyclodecanone. The waste sample had an average composition as follows: NaOH, about 0.6%; $Na_3BO_3$, about 2%; and Na organic salts, about 3.6%. The Na organic salts were primarily neutralized monobasic and dibasic acids of 11 to 12 carbon chain length, being present in the following average percentages: $Na_2$-dodecanedioic acid, 50%; $Na_2$-undecanedioic acid, 29.1%; Na-undecanoic acid, 11%; and Na-dodecanoic acid, 9.9%.

EXAMPLE 1

Solubilities of sodium carbonate, sodium bicarbonate, boric acid, and their mixtures with sodium hydroxide were measured using a 300-ml capacity, magnetically stirred autoclave. A minimum of eight data points were generated for each solute/solute mixture at two pressures (3,500 psi and 4,000 psi) and four temperatures (400° C., 425° C., 450° C. and 475° C.).

The experimental procedure involved six steps: (1) loading about 50 ml aqueous composition of a solute or solute mixture into the autoclave; (2) heating the autoclave to a desired temperature and pressure (the autoclave pressure may be adjusted by releasing fluid or injecting water); (3) stirring the autoclave content at about one rpm throughout the experiment; (4) collecting samples, after the autoclave stabilized for 10–15 minutes, until the autoclave pressure dropped to about 200 psi lower than the initial sampling pressure; (5) rebuilding the autoclave pressure by either injecting water or increasing temperature; and (6) repeating the test procedures for other temperatures and pressures as established in steps (4) to (5).

Solubilities of these compounds were quantified by measuring the effluent concentration of carbon (Total Inorganic Carbon Analysis), and sodium and boron (Inductively Coupled Plasma Analysis). Excess solute was loaded into the autoclave to ensure sufficient availability of solute during each experimental cycle. To verify the continuing presence of solute during each test, the concentration of the solute in the residual solution was determined.

Sodium Carbonate

The first step towards the validation of the process of this invention was to show that sodium carbonates are virtually insoluble in supercritical water. In this case, sodium in the waste stream can be effectively removed by forming carbonate salts with carbon dioxide produced from SCWO of organic components. Because of this important aspect, a total of 29 sodium carbonate data points were generated. At a pressure of 4000 psi, the solubilities of sodium carbonate in water range from about 400 mg/kg to 100 mg/kg as temperatures ranged from 400° C. to 475° C., respectively. Similarly, at a pressure of 3500 psi, the solubilities of sodium carbonate in water varied from 150 mg/kg to 25 mg/kg as temperatures ranged from 400° C. to 475° C., respectively.

Sodium Bicarbonate

A total of 13 data points were generated for the sodium bicarbonate test. Solubilities of sodium bicarbonate in supercritical water exhibited trends similar to those of sodium carbonate. However, the solubility values for sodium bicarbonate appeared to be slightly lower than those for sodium carbonate at the corresponding pressures and temperatures.

Sodium Hydroxide+Boric Acid

Since $Na_3BO_3$ was not available from major chemical product suppliers, an attempt was made to prepare the borate salt by mixing sodium hydroxide and boric acid. A ratio of sodium to boron of 3:1 was used in the experiment. It was found that concentrations of sodium and boron were generally comparable. These results indicate that the sodium borate salt should have a sodium (atomic weight=22.991) to boron (atomic weight=10.811) molar ratio of about 1:2. If this is the case, this molar ratio indicates the presence of sodium tetraborate ($Na_2B_4O_7$).

Sodium Carbonate+Boric Acid

The equivalent solubilities of sodium carbonate derived from a mixture of sodium carbonate and boric acid are similar to those obtained from the sodium carbonate measurements. However, equivalent borate to carbonate molar ratios ranged from 8 to 16, indicating that sodium was preferably precipitated with carbonate. Such results appear to be favorable for sodium removal by carbonate precipitation and boric acid recovery.

Sodium Carbonate+Sodium Bicarbonate+Sodium Hydroxide+Boric Acid

An equal molar mixture of sodium carbonate, sodium bicarbonate, sodium hydroxide, and boric acid was used to study the distribution of sodium, carbon, and boron species in a limited range of supercritical water. It was found that the solubilities of carbonates appear to be suppressed while the borate solubilities are relatively constant at about 300 mg/kg solution at most temperatures and pressures studied. The results from this solute mixture, which was intended to simulate the effluent from SCWO of the waste, also supports the concept of sodium removal by carbonate precipitation and boric acid recovery.

Boric Acid

Unlike the salt solubilities described above, boric acid solubility in supercritical water increased with increased temperature. The boric acid solubility ranged from 11,000 mg/kg to 30,000 mg/kg, respectively, for temperatures of 400° C. to 475° C. These boric acid concentrations in water corresponded to 1.1 wt % and 3 wt %.

Overall Observations and Summary

The results, under the test conditions, indicated that the solubility of boron was eight to sixteen times greater than that of carbon. Sodium demonstrated a preference for the formation of carbonate salts. A 3% boric acid concentration was obtained in the supercritical water phase. This confirms the initial treatment concept involving salt separation and acid concentration steps.

EXAMPLE 2

Thirteen continuous-flow SCWO tests were conducted on the wastewater from a nylon monomer manufacturing process. A process flow diagram of the continuous-flow SCWO system employed in this example is shown in FIG. 3. Test conditions and results on efficiencies of organic carbon conversion, boron recovery, and sodium removal are shown in Table 1. These test conditions covered temperatures from 400° C. (752° F.) to 500° C. (932° F.), pressures from 3500 psi to 4000 psi, wastewater concentrations from 10% to full strength, and reactor residence times from about 1 min to about 3 min. Most of these tests were conducted using pure oxygen. Two tests conducted at 500° C. utilized air.

Initially, tests were conducted using diluted DP waste (10:1 dilution). At a pressure of 3500 psi, both organic carbon conversion and sodium removal efficiencies were about 90% at 400° C. and increased gradually with temperature to about 98% at 500° C. However, the boron recovery efficiency decreased with increasing temperature from about 50% to 400° C. to about 40% at 450° C.

The last few experiments involved feeding more concentrated wastes (50% to full strength). Results from these tests (all conducted at 450° C. and 3500 psi) showed efficiencies for both organic carbon conversion and sodium removal remained greater than 95% at all three feed concentrations. However, the efficiency of boron recovery increased to greater than 91% when treating the full strength waste. These results indicated that 5% to 10% of boron may have formed sodium salts.

salt in an aqueous composition containing the first salt, comprising the steps of:
  contacting said aqueous composition with second anionic counterions under supercritical water conditions such that said first cationic counterion component of said first salt and said second anionic counterions form a second salt precipitate; and
  separating said second salt precipitate from said first anionic counterion component of said first salt;
  wherein said second salt is less soluble in supercritical water than said first salt.

3. The process of claim 2, wherein the first anionic counterions are halide, sulfate, nitrate or phosphate ions.

4. The process of claim 2, wherein the second anionic counterions are generated by supercritical water oxidation of an organic substance containing halide, sulfur, nitrogen or phosphorus atoms to form halide, sulfate, nitrate or phosphate ions which are the second anionic counterions.

5. The process of claim 1, wherein the second anionic counterions are carbonate ion derived from introduction of carbon dioxide.

6. The process of claim 1, wherein a temperature of at least about 450° C. is maintained during the contacting.

7. The process of claim 1, wherein the process is conducted in a continuous operation.

TABLE 1

Results from Organic Carbon Conversion and Boric Acid Recovery Tests
(Tests Conducted using a Continuous-Flow Reactor System)

| Feed | | | | | Water | Oxidant | | Reactor Res. | TOC | Boron | Sodium | |
|---|---|---|---|---|---|---|---|---|---|---|---|---|
| Strength | Flow | Pressure | Temperature | | Density | | Flow | Time | DRE | Recovery | Removal | |
| Waste* | (g/min) | (psig) | ((°F.) | (°C.) | (g/ml) | Type | (sccm) | (sec) | (%) | (%) | (%) | Test Date |
| 10% | 8.5 | 4000 | 932 | 500 | 0.1021 | Air | 150 | 103 | 98.3 | 38.7 | 98.6 | 3/1/95 |
| 10% | 10 | 3500 | 932 | 500 | 0.08523 | Air | 150 | 73 | 97.3 | 46.0 | 98.4 | 3/2/95 |
| 10% | 10 | 4000 | 842 | 450 | 0.1274 | Oxygen | 30 | 109 | 97.6 | 45.8 | 96.3 | 3/3/95 |
| 10% | 10 | 3500 | 842 | 450 | 0.1025 | Oxygen | 30 | 88 | 94.8 | 37.2 | 96.9 | 3/3/95 |
| 10% | 9.5 | 3500 | 797 | 425 | 0.1177 | Oxygen | 30 | 106 | 90.3 | 40.4 | 90.5 | 3/3/95 |
| 10% | 9.8 | 4000 | 797 | 425 | 0.1537 | Oxygen | 30 | 134 | 81.0 | 51.6 | 82.8 | 3/6/95 |
| 10% | 8.3 | 3500 | 797 | 425 | 0.1177 | Oxygen | 30 | 121 | 97.0 | 47.0 | 97.6 | 3/6/95 |
| 10% | 10 | 4000 | 752 | 400 | 0.2386 | Oxygen | 30 | 204 | 98.0 | 50.8 | 63.8 | 3/7/95 |
| 10% | 9 | 3500 | 752 | 400 | 0.1485 | Oxygen | 30 | 141 | 91.4 | 51.7 | 88.5 | 3/7/95 |
| 50% | 8 | 3500 | 842 | 450 | 0.1025 | Oxygen | 150 | 110 | 95.9 | 87.6 | 99.3 | 3/8/95 |
| 100% | 9 | 3500 | 842 | 450 | 0.1025 | Oxygen | 300 | 97 | 97.3 | 91.4 | 99.7 | 3/8/95 |
| 100% | 8.5 | 3500 | 842 | 450 | 0.1025 | Oxygen | 300 | 103 | 99.4 | 85.7 | 99.6 | 3/28/95 |

Reactor Volume = 142.7 ml (40 feet long × ¼ inch outside diameter × 0.049 inch wall thickness tubing)
*Diluted with distilled and de-ionized water.

What is claimed is:

1. A process useful for separating metal ions from first anionic counterions in an aqueous composition containing the metal ions and the first anionic counterions, comprising:
  contacting the aqueous composition with second anionic counterions under supercritical water conditions such that the metal ions and the second anionic counterions form a precipitate, wherein the metal ions are more soluble in supercritical water with the first anionic counterions than with the second anionic counterions; and
  separating the precipitate from the first anionic counterions;
  wherein the metal ion is an alkali metal ion, wherein the first anionic counterions are borate and wherein the second anionic counterions are carbonate.

2. A process useful for electively separating first anionic counterion and first cationic counterion components of a first 8. A process useful for the separation of alkali metal from borate in an alkali metal borate aqueous composition, comprising:
  contacting the aqueous composition with carbon dioxide under supercritical water conditions such that alkali metal carbonate precipitates and boric acid forms; and
  separating the boric acid from the alkali metal carbonate precipitate.

9. The process of claim 8, wherein the aqueous composition further comprises organic material and wherein the carbon dioxide is provided by oxidation of the organic material induced by oxygen introduced during the contacting.

10. The process of claim 8, wherein the contacting occurs at a temperature greater than about 450° C.

11. The process of claim 9, wherein the organic material is at least one of indecanoic acid, dodecanoic acid, dodecanedioic acid, undecanedioic acid or alkali metal salts thereof.

12. The process of claim 8 defined further as being conducted in a continuous operation.

13. The process of claim 9, wherein at least a stoichiometric amount of oxygen sufficient to oxidize the carbon material is introduced.

14. The process of claim 9, wherein the organic material is present in an amount of from 0.1 to 20 percent by weight relative to the water.

15. A process useful for separating alkali metal ions and borate ions from an aqueous composition containing alkali metal borate and organic material, comprising:

contacting the aqueous composition with oxygen under supercritical water conditions to oxidize organic material to form carbon dioxide such that the carbon dioxide and alkali metal form an alkali metal carbonate precipitate and such that boric acid forms; and separating the boric acid from the alkali metal carbonate precipitate.

16. The process of claim 15, wherein the contacting occurs at a temperature of greater than about 450° C.

17. The process of claim 15, wherein the organic material is at least one of indecanoic acid, dodecanoic acid, dodecanedioic acid, undecanedioic acid or alkali metal salts thereof.

18. The process of claim 15 defined further as being conducted in a continuous operation.

19. The process of claim 15, wherein at least a stoichiometric amount of oxygen sufficient to oxidize the carbon material is employed.

20. A process useful for separating alkali metal ions from organic materials, comprising the steps of:

contacting an aqueous composition containing alkali metal carboxylate with carbon dioxide under supercritical water conditions such that alkali metal carbonate precipitates and such that carboxylic acid forms; and separating the carboxylic acid from the alkali metal carbonate precipitate;

wherein at least a portion of the carbon dioxide is produced by oxidation of the carboxylate or carboxylic acid by introducing oxygen during the contacting step.

21. The process of claim 20 wherein the alkali metal carboxylate contains about 2 to about 16 carbon atoms.

22. The process of claim 20, wherein the contacting occurs at a temperature of greater than about 450° C.

23. The process of claim 20, wherein the alkali metal carboxylate is a sodium salt of indecanoic acid, dodecanoic acid, dodecanedioic acid, undecanedioic acid, acetic acid, or mixture thereof.

24. The process of claim 20, wherein the process is conducted in a continuous operation.

25. The process of claim 20, wherein at least a stoichiometric amount of oxygen sufficient to oxidize the carbon material is employed.

26. A process useful for separating metal ions from carboxylic acids in an aqueous composition containing the metal ions and a carboxylic acid precursor, comprising the steps of:

converting the carboxylic acid precursor to carboxylate and carbon dioxide under supercritical water conditions such that metal carbonate precipitates and carboxylic acid forms; and separating the carboxylic acid from the metal carbonate precipitate.

27. The process of claim 26, wherein the carboxylic acid precursor is a carboxylic acid having from about 6 to about 16 carbon atoms and containing one or two acid groups.

28. The process of claim 26, wherein the carboxylic acid precursor is at least one of an aliphatic hydrocarbon, an aromatic hydrocarbon, or a derivative of an aliphatic or aromatic hydrocarbon containing heteroatoms.

29. The process of claim 26, wherein the carboxylic acid precursor is biomass.

30. The process of claim 26, wherein the carboxylic acid precursor is present in a solution of water soluble substances.

31. The process of claim 26, wherein the carboxylic acid precursor is present in a solids-containing slurry.

32. The process of claim 26, wherein the step of converting further comprises the step of introducing an oxidant, and wherein at least a portion of the carbon dioxide is produced by oxidation of the carboxylic acid precursor to carboxylate.

33. The process of claim 26, wherein the step of converting occurs at a temperature of at least about 400° C.

34. The process of claim 26, wherein the process is conducted in a continuous operation.

35. The process of claim 26, wherein the carboxylate contains from about 2 to about 16 carbon atoms.

36. The process of claim 32, wherein an amount of the oxidant is varied to achieve partial oxidation of the carboxylic acid precursor to carboxylate and carbon dioxide.

37. The process of claim 26, wherein the metal ion is in the form of a hydroxide, an inorganic salt, an organic salt, or a mixture thereof.

38. The process of claim 26, wherein the metal ion is a cation which forms insoluble salts with anions present under supercritical water conditions.

39. The process of claim 38, wherein the anion is at least one of a carbonate, halide, phosphate, sulfate, or nitrate.

40. The process of claim 26, wherein an amount of metal ions present is a sufficient amount to be precipitated as metal carbonates with carbon dioxide produced in the process.

41. The process of claim 26, wherein an amount of metal ions present is a sufficient amount to be precipitated as metal carbonates with carbon dioxide present in the process.

42. The process of claim 26, wherein the step of converting is carried out in the presence of a catalyst comprising a metal component.

43. The process of claim 32, wherein the step of converting is carried out in the presence of a catalyst comprising a metal component.

44. The process of claim 42, wherein the catalyst is an oxide.

45. The process of claim 42, wherein an amount of the catalyst present is a sufficient amount to effect the conversion of the carboxylic acid precursor to carboxylate.

46. The process of claim 43, wherein the catalyst is an oxide.

47. The process of claim 43, wherein an amount of the catalyst present is a sufficient amount to effect the conversion of the carboxylic acid precursor to carboxylate.

48. The process of claim 26, wherein at least a portion of the carbon dioxide is produced by selective conversion of the carboxylic acid precursor to carboxylate.

* * * * *